United States Patent [19]
Takayama et al.

[11] Patent Number: 6,079,793
[45] Date of Patent: Jun. 27, 2000

[54] BRAKE CONTROL SYSTEM

[75] Inventors: Toshio Takayama; Kunihiro Matsunaga, both of Yamanashi-ken, Japan

[73] Assignee: Tokico Ltd., Kanagawa-ken, Japan

[21] Appl. No.: 08/949,028

[22] Filed: Oct. 10, 1997

[30] Foreign Application Priority Data

Oct. 18, 1996 [JP] Japan .................................. 8-276539

[51] Int. Cl.$^7$ .......................... B60T 11/20; B60T 13/70; B60T 15/14; B60T 8/40
[52] U.S. Cl. ................................ 303/14; 303/15; 303/20; 303/116.1
[58] Field of Search ................................ 303/14, 15, 20, 303/116.1, 116.2

[56] References Cited

U.S. PATENT DOCUMENTS

| | | | |
|---|---|---|---|
| 4,658,939 | 4/1987 | Kircher et al. | 188/156 |
| 4,858,737 | 8/1989 | Tourneur et al. | 188/358 |
| 4,936,638 | 6/1990 | Burgdorf | 303/119 |
| 4,989,925 | 2/1991 | Kohno | 303/116 |
| 5,174,637 | 12/1992 | Kervagoret | 303/117.1 |
| 5,302,008 | 4/1994 | Miyake et al. | 303/14 |
| 5,332,297 | 7/1994 | Cunkelman et al. | 303/15 |
| 5,333,944 | 8/1994 | Shirai et al. | 303/105 |
| 5,456,523 | 10/1995 | Boehringer | 303/13 |

FOREIGN PATENT DOCUMENTS

| | | |
|---|---|---|
| 31 31 856 A1 | 2/1983 | Germany .............................. 303/116.2 |
| 42 29 041 A1 | 3/1993 | Germany . |
| 195 12 254 A1 | 10/1996 | Germany . |
| 58-39551 | 3/1983 | Japan . |
| 5-39008 | 2/1993 | Japan . |
| 5-39014 | 2/1993 | Japan . |
| 5-65060 | 3/1993 | Japan . |

*Primary Examiner*—Robert J. Oberleitner
*Assistant Examiner*—Jeffrey Woller
*Attorney, Agent, or Firm*—Wenderoth, Lind & Ponack, L.L.P.

[57] ABSTRACT

A brake control system includes a master cylinder for developing a brake fluid pressure in response to brake pedal displacement, wheel cylinders mounted to front and rear wheels and adapted to develop a braking force, an actuator for feeding the brake fluid pressure to the respective wheel cylinders, and a controller adapted to enable the actuator to provide a controlled brake fluid pressure to the respective wheel cylinders. Two switch valves are adapted to normally prevent fluid communication between the master cylinder and the wheel cylinders and in the event of a system failure, permit fluid communication between the master cylinder and the wheel cylinders and prevent fluid communication between the actuator and the wheel cylinders. The switch valves are mounted solely to the wheel cylinders of the front wheels.

4 Claims, 2 Drawing Sheets

BRAKE CONTROL SYSTEM

BACKGROUND OF THE INVENTION

The present invention relates to brake control systems, and more particularly to an economical brake control system.

A known brake control system for a motor vehicle typically includes a master cylinder for developing a brake fluid pressure in response to brake pedal displacement, stroke simulators adapted to accommodate the brake fluid pressure, wheel cylinders mounted to respective wheels and adapted to develop a braking force, an actuator for feeding the brake fluid pressure to the wheel cylinders, and a controller adapted to enable the actuator to feed a controlled brake fluid pressure to the wheel cylinders, as disclosed in Japanese laid-open patent publication No. 5-39008.

Switch valves are provided to normally prevent fluid communication between the master cylinder and the wheel cylinders and permit fluid communication between the actuator and the wheel cylinders and in the event of a system failure, permit fluid communication between the master cylinder and the wheel cylinders and prevent fluid communication between the actuator and the wheel cylinders. The switch valves are mounted to all of the wheel cylinders. This results in an increase in the production cost of the system.

Two pressure chambers are defined in the master cylinder. Switch valves are also arranged in these two pressure chambers so as to normally permit fluid communication between the stroke simulators and the master cylinder, and in the event of a system failure, prevent fluid communication between the master cylinder and the stroke simulators. The stroke simulators are also arranged in the pressure chambers. This arrangement results in a further increase in the cost of the system.

Accordingly, it is an object of the present invention to provide an inexpensive brake control system.

SUMMARY OF THE INVENTION

According to one aspect of the present invention, there is provided a brake control system comprising a master cylinder for developing a brake fluid pressure in response to brake pedal displacement, stroke simulators for receiving a brake fluid, the amount of which corresponds to the brake fluid pressure developed by the master cylinder, wheel cylinders mounted to front and rear wheels and adapted to develop a braking force, an actuator for feeding the brake fluid pressure to the respective wheel cylinders, a controller adapted to enable the actuator to provide a controlled brake fluid pressure to the respective wheel cylinders, and switch valves adapted to normally prevent fluid communication between the master cylinder and the wheel cylinders and permit fluid communication between the actuator and the wheel cylinders and, in the event of a system failure, permit fluid communication between the master cylinder and the wheel cylinders and prevent fluid communication between the actuator and the wheel cylinders. As a feature of the present invention, the switch valves are mounted to the wheel cylinders solely for the front wheels.

It has been found that a system failure can be accommodated by applying a baking force solely to the front wheels, rather than to the both front and rear wheels. The switch valves are therefore arranged in the wheel cylinders of the front wheels, but not in the wheel cylinders of the rear wheels. This arrangement eliminates the need for a proportioning valve designed to prevent locking of the rear wheels prior to locking of the front wheels since a braking force is applied solely to the wheel cylinders of the front wheels.

The master cylinder is required to develop only a small amount of fluid pressure since there is no need to apply a fluid pressure to the wheel cylinders of the rear wheels. The present invention thus allows for the use of a small-sized master cylinder, eliminates the need to reduce a pedal ratio, and requires less force to depress a brake pedal in the event of a system failure.

According to another aspect of the present invention, there is provided a brake control system comprising a master cylinder for developing a brake fluid pressure in response to brake pedal displacement, a stroke simulator for receiving a brake fluid, the amount of which corresponds to the brake fluid pressure developed by the master cylinder, two pairs of front and rear wheel cylinders mounted to front and rear wheels, respectively, and adapted to develop a braking force, an actuator for feeding the brake fluid pressure to the respective wheel cylinders, a controller adapted to enable the actuator to provide a controlled brake fluid pressure to the respective wheel cylinders, and a switch valve adapted to normally permit fluid communication between the stroke simulator and the master cylinder and, in the event of a system failure, prevent fluid communication between the master cylinder and the stroke simulator. The master cylinder is a tandem master cylinder within which two pressure chambers are defined to develop a brake fluid pressure in response to brake pedal displacement. As a feature of the present invention, the switch valve is arranged in only one of the pressure chambers.

In a preferred mode, the switch valve is solenoid-operated or driven by electric power. The switch valve is adapted to permit fluid communication between the master cylinder and the wheel cylinders and prevent fluid communication between the actuator and the wheel cylinders when no electric power is supplied, and to prevent fluid communication between the master cylinder and the wheel cylinders and permit fluid communication between the actuator and the wheel cylinders when electric power is supplied. The switch valve enables development of a braking force even if the supply of electrical power is accidentally stopped, and the controller is unable to detect such an electrical failure.

According to yet another aspect of the present invention, there is provided a brake control system comprising a first braking force applying means for developing and applying a braking force to a pair of first wheels, a second braking force applying means for developing and applying a braking force to a pair of second wheels, primary fluid pressure supplying means for supplying a primary fluid pressure to the first braking force applying means and the second braking force applying means, secondary fluid pressure supplying means for supplying a secondary fluid pressure solely to the first braking force applying means, and selecting means for normally permitting fluid communication between the primary fluid pressure supplying means and the first braking force applying means and, in the event of system failure, permitting fluid communication between the secondary fluid pressure supplying means and the first braking force applying means.

In a preferred mode, the brake control system may further include means for receiving a brake fluid, the amount of which corresponds to the secondary fluid pressure developed by the secondary fluid pressure supplying means, and switch means for normally permitting fluid communication between the secondary fluid pressure supply means and the means for receiving and in the event of a system failure, preventing fluid communication between the secondary fluid pressure supplying means and the means for receiving and permitting fluid communication between the secondary fluid pressure supplying means and the selector means.

According to a further aspect of the present invention, there is provided a brake control system comprising first braking force applying means for developing and applying a braking force to a pair of first wheels, second braking force applying means for developing and applying a braking force to a pair of second wheels, primary fluid pressure supplying means for supplying a primary fluid pressure to the first braking force applying means and the second braking force applying means, first secondary fluid pressure supply means for supplying a secondary fluid pressure to the first braking force applying means, second secondary fluid pressure supplying means for supplying the secondary fluid pressure to the second braking force applying means, first selector means for normally permitting fluid communication between the primary fluid pressure supplying means and the second braking force applying means and in the event of a system failure, permitting fluid communication between the second secondary fluid pressure supplying means and the second braking force applying means, and means for receiving a brake fluid, the amount of which corresponds only to the secondary fluid pressure developed by the second secondary fluid pressure supplying means.

In a preferred mode, the brake control system may further include second selector means for normally permitting fluid communication between the primary fluid pressure supplying means and the first braking force applying means and, in the event of a system failure, permitting fluid communication between the first secondary fluid pressure supplying means and the first braking force applying means, and switch means for normally permitting fluid communication between the second secondary fluid pressure supply means and the means for receiving and in the event of a system failure, preventing fluid communication between said second secondary fluid pressure supplying means and the means for receiving. A proportioning valve may also be disposed between the second secondary fluid pressure supplying means and the first selector means.

BRIEF DESCRIPTION OF THE DRAWINGS

The present invention may be best understood by reference to the following description of preferred embodiments when taken in conjunction with the accompanying drawings, in which.

DESCRIPTION OF THE PREFERRED EMBODIMENTS

Figure 1:
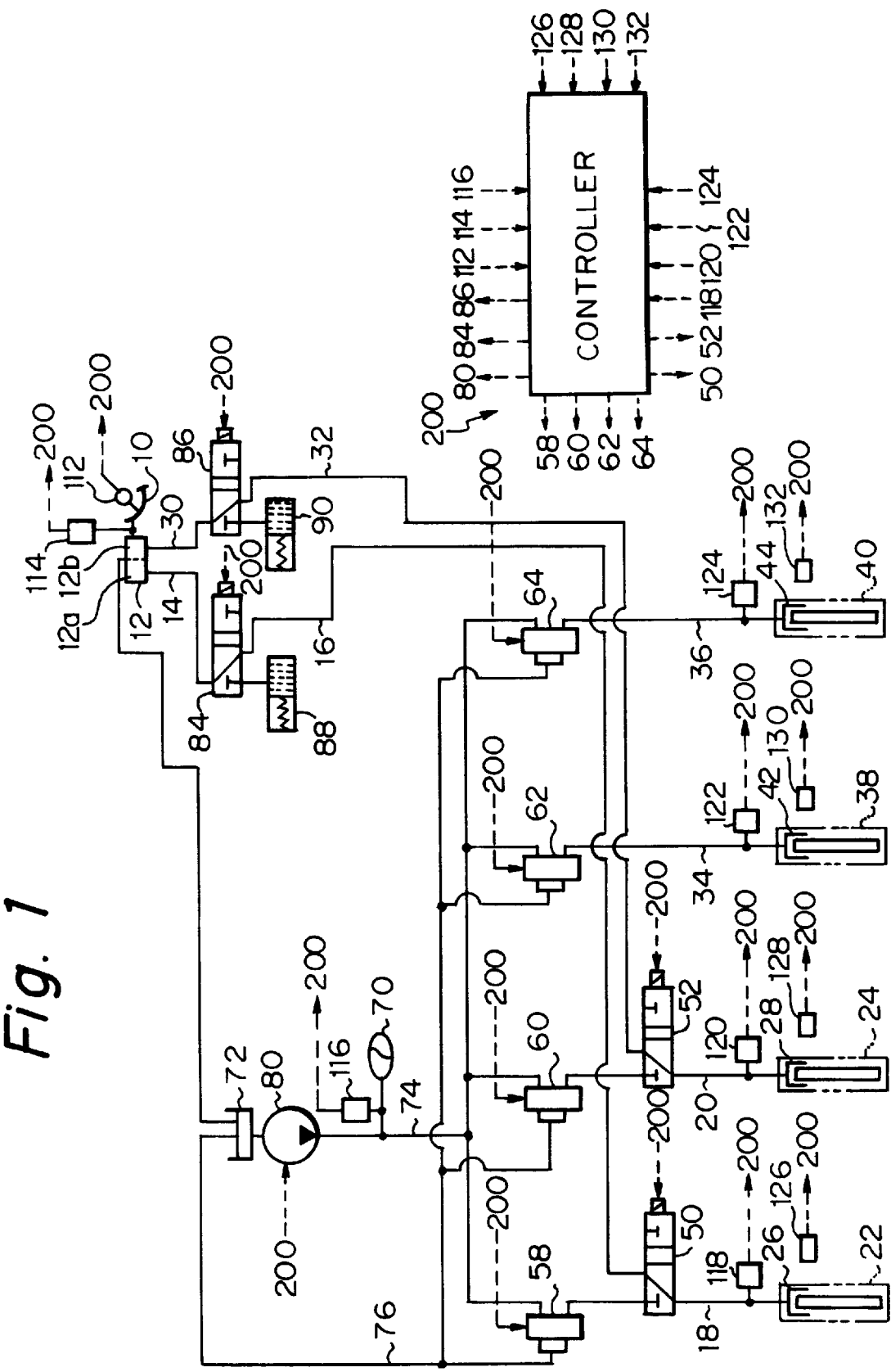
FIG. 1 is a diagrammatic representation of a brake control system according to one embodiment of the present invention.

Referring now to FIG. 1, there is illustrated a brake control system according to one embodiment of the present invention. A brake foot pedal 10 is connected to a tandem master cylinder 12 within which two pressure chambers 12a and 12b are defined so as to develop fluid pressure in response to brake pedal displacement. The pressure chamber 12a is connected through lines 14, 16 and 18 to a wheel cylinder 26 which is, in turn, mounted to a left front wheel 22. The pressure chamber 12b is connected through lines 30, 32 and 20 to a wheel cylinder 28 which is, in turn, mounted to a right front wheel 24.

A wheel cylinder 42 is mounted to a left rear wheel 38. Similarly, a wheel cylinder 44 is mounted to a right rear wheel 40. Lines 34 and 36 have one end connected to the left and right rear wheels 38 and 40, but the other end of each of the lines 34 and 36 is not connected to either of the pressure chambers 12a and 12b of the tandem master cylinder 12.

In this embodiment, the line 18 is provided with a solenoid valve (switch valve) 50 and a fluid pressure control valve (actuator) 58. Similarly, the line 20 is provided with a solenoid valve (switch valve) 52 and a fluid pressure control valve (actuator) 60. The lines 34 and 36 connected to the rear wheels 38 and 40 are provided with fluid pressure control valves (actuators) 62 and 64, but are devoid of solenoid valves as provided in the lines 18 and 20.

The solenoid valves 50 and 52, e.g. solenoid-operated, 2-position, 3-port, directional control valves, are driven by electric power. In case of a system failure, the solenoid valve 50 is deactivated in the absence of electric power to bring the wheel cylinder 26 into fluid communication with a solenoid valve 84, which will be described later, and thus, the tandem master cylinder 12 and prevent fluid communication between the wheel cylinder 26 and the fluid pressure control valve 58, as shown in FIG. 1. During normal operation of the system, the solenoid valve 50 is activated on supply of electric power to prevent fluid communication between the wheel cylinder 26 and the solenoid valve 84, and thus the tandem master cylinder 12, to bring the wheel cylinder 26 into fluid communication with the fluid pressure control valve 58.

Similarly, when no electrical power is supplied, the solenoid valve 52 is deactivated so as to bring the wheel cylinder 28 into fluid communication with a solenoid valve 86, which will be described later, and thus the tandem master cylinder 12 and prevent fluid communication between the wheel cylinder 28 and the fluid pressure control valve 60. During normal operation of the system, the solenoid valve is activated on supply of electrical power to prevent fluid communication between the wheel cylinder 28 and the solenoid valve 86, and thus the tandem master cylinder 12, and permit fluid communication between the wheel cylinder 28 and the fluid pressure control valve 60.

The fluid pressure control valves 58, 60, 62 and 64 are connected to a common accumulator (actuator) 70 and a reservoir 72 through respective lines 74 and 76. A pump (actuator) 80 is connected between the reservoir 72 and the accumulator 70 to pump out fluid from the reservoir 72 to build up a predetermined range of fluid pressure in the accumulator 70. Upon receipt of a controlled energizing current from the controller 200, the fluid pressure control valves 58, 60, 62 and 64 are operable to feed a controlled fluid pressure to the wheel cylinders 26, 28, 42 and 44 so as to restrict or retard rotation of the corresponding wheels 22, 24, 38 and 40.

The solenoid-operated, 2-position, 3-port, directional control valve 84 is arranged between the lines 14 and 16. A stroke simulator 88 is connected to the solenoid valve 84. Similarly, a solenoid-operated, 2-position, 3-port, direction control valve 86 is arranged between the lines 30 and 32. A stroke simulator 90 is connected to the solenoid valve 86.

The stroke simulators 88 and 90 are operable to receive a brake fluid from the tandem master cylinder 12 so as to allow for depression of the brake pedal 10. When the brake pedal 10 is depressed, a corresponding reactive force is developed and then applied to the brake pedal 10. The fluid pressure control valves 58, 60, 62 and 64 are operable to develop a controlled fluid pressure to thereby restrict rotation of the wheels 22, 24, 38 and 40. At this time, the solenoid valves 84 and 86 are activated to provide fluid communication between the tandem master cylinder 12 and the stroke simulators 88 and 90. This communication provides a driver with such a "feel" that the brake pedal is directly connected to the wheel cylinders 26, 28, 42 and 44.

The solenoid valves 84 and 86 are solenoid-operated or driven by electric power. In the event of a system failure, the solenoid valve 84 is deactivated in the absence of electric power to prevent fluid communication between the pressure chamber 12a within the tandem master cylinder 12 and the stroke simulator 88 and permit fluid communication between this pressure chamber 12a and the solenoid valve 50 so as to bring the pressure chamber 12a into fluid communication with the wheel cylinder 26, as shown in FIG. 1. During normal operation of the system, the solenoid valve 84 is electrically driven or activated to permit fluid communication between the pressure chamber and the stroke simulator 88 and prevent fluid communication between the pressure chamber and the solenoid valve 50 and thus, the wheel cylinder 26.

Similarly, the solenoid valve 86 is deactivated in the event of a system failure so as to prevent fluid communication between the other pressure chamber 12b of the tandem master cylinder 12 and the stroke simulator 90 and permit fluid communication between the other pressure chamber 12b and the solenoid valve 52 so as to bring the other pressure chamber 12b into fluid communication with the wheel cylinder 28. During the normal operation of the system, the solenoid valve 86 is activated on supply of electric power so as to permit fluid communication between the other pressure chamber 12b and the stroke simulator 90 and prevent fluid communication between the other pressure chamber 12b and the solenoid valve 52 and thus, the wheel cylinder 28.

The brake control system is operated under the control of a controller 200. The controller 200 is connected to the solenoid valves 50 and 52, the fluid pressure control valves 58, 60, 62 and 64, the pump 80, and the solenoid valves 84 and 86. The controller 200 is also connected to a brake switch 112 for sensing depression of the brake pedal 10, a displacement sensor 114 for sensing a force applied to the brake pedal 10, a fluid pressure sensor 116 for sensing a fluid pressure within the accumulator 70, fluid pressure sensors 118, 120, 122 and 124 for sensing fluid pressures within the respective wheel cylinders 26, 28, 42 and 44, and speed sensors 126, 128, 130 and 132 for sensing the speed of rotation of the front wheels 22 and 24 and the rear wheels 38 and 40.

Each of the fluid pressure control valves 58, 60, 62 and 64 provides a controlled fluid pressure under which the brake control system is operated. Normally, when the brake switch 112 becomes on, the controller 200 is operable to activate all of the solenoid valves 50, 52, 84 and 86. The wheel cylinders 26 and 28 are then brought into fluid communication with the fluid pressure control valves 58 and 60 and maintained out of fluid communication with the solenoid valves 84 and 86. Meanwhile, the tandem master cylinder 12 is brought into fluid communication with the stroke simulators 88 and 90 and maintained out of fluid communication with the solenoid valves 50 and 52. At this time, the wheel cylinders 42 and 44 are communicated with the fluid pressure control valves 62 and 64.

With the brake switch 112 on, the stroke simulators 88 and 90 receive a brake fluid from the tandem master cylinder 12 and permit depression of the brake pedal 10. As the brake pedal 10 is depressed, a corresponding reactive force is applied to the brake pedal 10. The displacement sensor 114 is operable to sense a force applied to the brake pedal 10 and send a corresponding signal to the controller 200. Also, the speed sensors 126, 128, 130 and 132 are operable to sense the speed of rotation of the front and rear wheels and send a corresponding signal to the controller 200. The controller 200 is then operable to calculate actual deceleration and a target deceleration. The controller 200 also calculates loads exerted on the front wheels 22 and 24 and the rear wheels 38 and 40 and determines an optimal fluid pressure. This optimal fluid pressure is compared with a fluid pressure supplied to each of the wheel cylinders 26, 28, 42 and 44 which is sensed by each of the fluid pressure sensors 118, 120, 122, and 124. The controller 200 is thereafter operable to apply a control current to the fluid pressure control valves 58, 60, 62 and 64 whereby a controlled fluid pressure is sent to each of the wheel cylinders 26, 28, 42 and 44.

In the event that the brake control system malfunctions, for example, if the level of a fluid pressure within the wheel cylinders 26, 28, 42 and 44 is below or above that of a controlled fluid pressure, the controller 200 is operable to deactivate the fluid pressure control valves 58, 60, 62 and 64 and the solenoid valves 50, 52, 84 and 86. The wheel cylinders 26 and 28 are thereby disconnected from the fluid pressure control valves 58 and 60 and instead, brought into fluid communication with the solenoid valves 84 and 86. Also, the tandem master cylinder 12 is disconnected from the stroke simulators 88 and 90 and instead, brought into fluid communication with the solenoid valves 50 and 52.

As a result, the pressure chamber 12a within the tandem master cylinder 12 is brought into fluid communication with the wheel cylinder 26 through the line 14, the solenoid valve 84, the line 16, the solenoid valve 50 and the line 18. A brake fluid pressure as developed within this pressure chamber 12a on depression of the brake pedal 10 is transmitted to the wheel cylinder 26 of the left front wheel 22. Similarly, the other pressure chamber 12b is brought into fluid communication with the wheel cylinder 28 through the line 30, the solenoid valve 86, the line 32, the solenoid valve 52 and the line 20. A brake fluid pressure as developed within the other pressure chamber 12b on depression of the brake pedal 10 is transmitted to the wheel cylinder 28 of the left front wheel 24.

As thus far described, a fluid pressure as developed in the tandem master cylinder 12 in response to brake pedal displacement is transmitted solely to the wheel cylinders 26 and 28 of the front wheels 22 and 24. In other words, a braking force is applied to the front wheels 22 and 24 only.

In the event that an electrical system malfunctions, the solenoid valves 50 and 52 and the solenoid valves 84 and 86 are deactivated in the absence of electric power to allow a fluid pressure as developed in response to brake pedal displacement to be transmitted from the tandem master cylinder 12 solely to the wheel cylinders 26 and 28 of the front wheels 22 and 24.

It should be noted that normally, loads are less imposed on the rear wheels 38 and 40 than on the front wheels 22 and 24. Particularly in a front-wheel, front-driven vehicle, only 30 to 40 percent of the entire loads is imposed on the rear wheels. During braking, deceleration causes the loads exerted on the rear wheels 38 and 40 to be transferred to the front wheels 22 and 24. As a braking force of say, 0.5 g is developed, the loads exerted on the rear wheels 38 and 40 is reduced by around 10 percent. It has been found that in the event of a system failure, a braking force needs to be applied solely to the front wheels 22 and 24. As a feature of the present invention, the solenoid valves 50 and 52 are mounted solely to the wheel cylinders 26 and 28 of the front wheels 22 and 24 so that normally, the wheel cylinders 26 and 28 are disconnected from the tandem master cylinder 12 and instead communicated with the fluid pressure control valves 58 and 60, and in the event of a system failure, the wheel cylinders 26 and 28 are communicated with the tandem master cylinder 12 and disconnected from the fluid pressure control valves 58 and 60. This arrangement eliminates the need to mount any solenoid valve to the rear wheels 38 and 40 and thus enables a reduction in the cost, size and weight of the entire brake control system.

The solenoid valves 50 and 52 are operatively associated only with the wheel cylinders 26 and 28 of the front wheels 22 and 24, whereby a braking force is developed only by the front wheel cylinders 26 and 28. This arrangement eliminates the need for a proportioning valve, as often used in the prior art, adapted to prevent locking of the rear wheels prior to locking of the front wheels. It should be noted that a vehicle becomes unstable if the rear wheels are locked before the front wheels are locked. To this end, a proportioning valve is conventionally provided so as to maintain the level of a fluid pressure within the wheel cylinders of the rear wheels less than that of a fluid pressure within the wheel cylinders of the front wheels. The present invention eliminates the need to provide such a proportioning valve since no brake fluid pressure needs be transmitted to the wheel cylinders 42 and 44 of the rear wheels 38 and 40. This results in a further reduction in the cost, size and weight of the brake control system.

In the event of a system failure, the tandem master cylinder 12 is required to develop and transmit only a small amount of brake fluid to the wheel cylinders 26 and 28 of the front wheels 22 and 24. This allows for the use of a small-sized master cylinder and brings about a reduction in the size, cost and weight of the entire master cylinder. Also, there is no need to reduce a pedal ratio. Moreover, less force is required to depress the brake pedal.

The solenoid valves 50 and 52 and the solenoid valves 84 and 86 are driven by electric power. If an electrical system malfunctions, the solenoid valves 50 and 52 and the solenoid valves 84 and 86 are deactivated in the absence of electric power to allow for development of a desired braking force.

Figure 2:
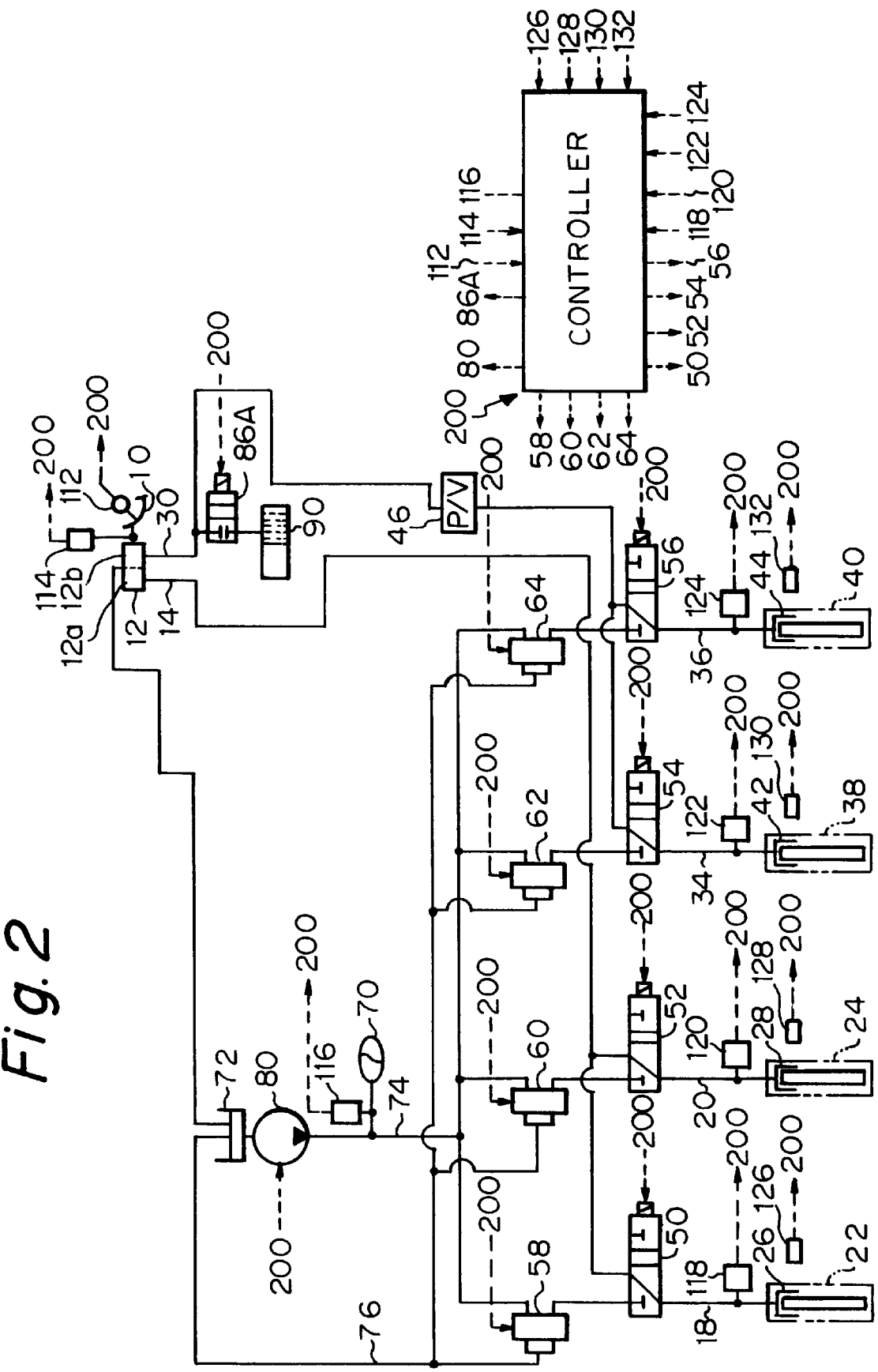
FIG. 2 is a diagrammatic representation of a brake control system according to another embodiment of the present invention.

Referring to FIG. 2, there is illustrated a brake control system according to another embodiment of the present invention. Like parts are given like reference numerals.

The pressure chamber 12a of the tandem master cylinder 12 is connected to the wheel cylinder 26 of the left front wheel 22 through the lines 14 and 18. The pressure chamber 12a is also connected to the wheel cylinder 28 of the right front wheel 24 through the lines 14 and 20.

The pressure chamber 12b is connected to the wheel cylinder 42 of the left rear wheel 38 through the lines 30 and 34. The pressure chamber 12b is also connected to the wheel cylinder 44 of the right rear wheel 40 through the lines 30 and 36.

The line 18 is connected to the solenoid valve (switch valve) 50 and the fluid pressure control valve (actuator) 58. The line 20 is connected to the solenoid valve (switch valve) 52 and the fluid pressure control valve (actuator) 60. The line 34 is connected to the solenoid valve (switch valve) 54 and the fluid pressure control valve (actuator) 62. The line 36 is connected to the solenoid valve (switch valve) 56 and the fluid pressure control valve (actuator) 64.

The solenoid valves 50, 52, 54 and 56 are of the type which has 2-position and 3-ports and is driven by electric power. In the event of a system failure, the solenoid valve 50 is deactivated in the absence of electric power so as to permit fluid communication between the wheel cylinder 26 and the pressure chamber 12a and prevent fluid communication between the wheel cylinder 26 and the fluid pressure control valve 58, as shown in FIG. 2. During normal operation of the system, the solenoid valve 50 is activated on supply of electric power so as to prevent fluid communication between the wheel cylinder 26 and the pressure chamber 12a and permit fluid communication between the wheel cylinder 26 and the fluid pressure control valve 58.

Similarly, in the event of a system failure, the solenoid valve 52 is deactivated in the absence of electric power so as to permit fluid communication between the wheel cylinder 28 and the pressure chamber 12a of the tandem master cylinder 12 and prevent fluid communication between the wheel cylinder 28 and the fluid pressure control valve 60. During normal operation of the system, the solenoid valve 52 is activated on supply of electric power so as to prevent fluid communication between the wheel cylinder 28 and the pressure chamber 12a and permit fluid communication between the wheel cylinder 28 and the fluid pressure control valve 60.

Also, the solenoid valve 54 is deactivated in the absence of electric power so as to permit fluid communication between the wheel cylinder 42 and the pressure chamber 12b of the tandem master cylinder 12 and prevent fluid communication between the wheel cylinder 42 and the fluid pressure control valve 62. During normal operation of the system, the solenoid valve 54 is activated on supply of electric power so as to prevent fluid communication between the wheel cylinder 42 and the pressure chamber 12b and permit fluid communication between the wheel cylinder 42 and the fluid pressure control valve 62.

Similarly, the solenoid valve 56 is deactivated in the absence of electric power so as to permit fluid communication between the wheel cylinder 44 and the pressure chamber 12b of the tandem master cylinder 12 and prevent fluid communication between the wheel cylinder 44 and the fluid pressure control valve 64. During normal operation of the system, the solenoid valve 56 is activated on supply of electric power so as to prevent fluid communication between the wheel cylinder 44 and the pressure chamber 12b and permit fluid communication between the wheel cylinder 44 and the fluid pressure control valve 64.

In this particular embodiment, neither solenoid valves nor stroke simulators are connected to the line 14. The line 30 is, in turn, connected to a solenoid valve 86A and the stroke simulator 90.

The solenoid valve 86A is of the type which has 2-positions and 3-ports and is driven by electric power. In the event of a system failure, the solenoid valve 86A is deactivated in the absence of electric power so as to prevent fluid communication between the tandem master cylinder 12 and the stroke simulator 90, as shown in FIG. 2. During normal operation of the system, the solenoid valve 86A is activated on supply of electric power so as to permit fluid communication between the tandem master cylinder 12 and the stroke simulator 90.

A proportioning valve 46 is connected to the line 30 between the solenoid valve 86A and the solenoid valves 54 and 56. The proportioning valve 46 maintains fluid pressure within the wheel cylinders 42 and 44 of the rear wheels 38 and 40 at a low level so as to prevent the rear wheels 38 and 40 from being locked before the front wheels 22 and 24 are locked.

Each of the fluid pressure control valves 58, 60, 62 and 64 provides a controlled fluid pressure under which the brake control system thus constructed is operated. As the brake switch becomes on, the controller 200 is operable to permit supply of electric power so as to activate all the solenoid valves 50, 52, 54, 56 and 86A. The wheel cylinders 26, 28, 42 and 44 are then brought into fluid communication with the fluid pressure control valves 58, 60, 62 and 64 and maintained out of communication with the tandem master cylinder 12. At this time, the pressure chamber 12b of the tandem master cylinder 12 is communicated with the stroke simulator 90.

When the brake pedal is depressed, a brake fluid is caused to flow from only one of the pressure chambers of the tandem master cylinder 12 into the stroke simulator 90. Introduction of the brake fluid into the stroke simulator 90 allows for further depression of the brake pedal 10. As the brake pedal 10 is depressed, the resulting reactive force is fed back to the brake pedal 10. As in the previous embodiment, the controller 200 is operable to calculate actual deceleration based on information on a force applied to the brake pedal 10 and speed of rotation of the front and rear wheels and determines a target deceleration. The controller 200 also calculates loads exerted on the front wheels 22 and 24 and the rear wheels 38 and 40 and determines an optimal fluid pressure. This optimal fluid pressure is compared with a fluid pressure supplied to each of the wheel cylinders 26, 28, 42 and 44 which is sensed by each of the fluid pressure sensors 118, 120, 122, and 124. The controller 200 is thereafter operable to apply a control current to the fluid pressure control valves 58, 60, 62 and 64 whereby a controlled fluid pressure is sent to each of the wheel cylinders 26, 28, 42 and 44.

In the event that the brake control system malfunctions, for example, if the level of a fluid pressure within the wheel cylinders 26, 28, 42 and 44 is below or above that of a controlled fluid pressure, the controller 200 is operable to deactivate the fluid pressure control valves 58, 60, 62 and 64 and the solenoid valves 50, 52, 54, 56 and 86A. The wheel cylinders 26, 28, 42 and 44 are thereby brought into fluid communication with the tandem master cylinder 12 and maintained out of fluid communication with the fluid pressure control valves 58, 60, 62 and 64. At this time, the tandem master cylinder 12 is disconnected from the stroke simulator 90.

As a result, the pressure chamber 12a within the tandem master cylinder 12 is directly communicated with the wheel cylinders 26 and 28 of the front wheels 22 and 24 through the line 14, the solenoid valves 50 and 52, and the lines 18 and 20. A brake fluid pressure as developed within this pressure chamber on depression of the brake pedal 10 is transmitted to the wheel cylinders 26 and 28 of the left front wheels 22 and 24. Similarly, the other pressure chamber 12b is directly communicated with the wheel cylinders 42 and 44 of the rear wheels 38 and 40 through the line 30, the solenoid valves 54 and 56, and the lines 34 and 36. A brake fluid pressure as developed within the other pressure chamber 12b on depression of the brake pedal 10 is transmitted to the wheel cylinders 42 and 44 of the rear wheels 38 and 40.

As thus far described, a fluid pressure as developed in the tandem master cylinder 12 in response to brake pedal displacement is transmitted to all the wheel cylinders 26, 28, 42 and 44 of the front and rear wheels. In other words, a braking force is applied to all the front and rear wheels. The proportioning valve 46 is operable, as the case may be, to maintain fluid pressure within the wheel cylinders 42 and 44 of the rear wheels 38 and 40 at a low level.

In the event of an electrical failure, the solenoid valves 50, 52, 54 and 56 and the solenoid valves 86A are deactivated in the absence of electric power to allow a fluid pressure as developed in response to brake pedal displacement to be transmitted from the tandem master cylinder 12 to all the wheel cylinders 26, 28, 42 and 44 of the front and rear wheels. Again, the proportioning valve 46 may maintain fluid pressure within the wheel cylinders 42 and 44 of the rear wheels 38 and 40 at a low level.

It should be noted that in this embodiment, only one of the pressure chambers is provided with the stroke simulator 90 so as to allow a brake fluid to flow from the tandem master cylinder 12 into the stroke simulator 90. This permits further depression of the brake pedal 10 without the need to provide the other pressure chamber with a stroke simulator. The stroke simulator 90 and the solenoid valve 86A are thus arranged in only one of the pressure chambers. This brings about a reduction in the cost, size and weight of the entire brake control system.

The solenoid valve 86A is driven by electric power. In the event that an electrical system malfunctions, the solenoid valve 86A is deactivated in the absence of electric power to prevent fluid communication between the tandem master cylinder 12 and the stroke simulator 90. In this way, a braking force can safely be developed even if the controller is unable to detect such a system failure. When electric power is supplied, the solenoid valve 86A is activated so as to permit fluid communication between the stroke simulator 90 and the tandem master cylinder 12.

The solenoid valve 86A is of the type which has 2-positions and 2-ports and is thus compact and lightweight. The solenoid valve 86A may be replaced by the solenoid valve 86 as used in the previous embodiment.

In the illustrated embodiment, the solenoid valve 86A and the stroke simulator 90 are arranged in the line 30 connected to the rear wheels 38 and 40. Alternatively, the solenoid valve 86A and the stroke simulator 90 may be arranged in the line 14 connected to the front wheels 22 and 24.

The present invention has been described with respect to its preferred embodiments. It will be appreciated that various modifications and changes may be made without departing from the scope of the invention. For example, in the embodiment shown in FIG. 1, the solenoid valve 84 and the stroke simulator 88 may be avoided, and the lines 14 and 16 directly connected together as in the embodiment shown in FIG. 2. Also, the lines 30 and 32 may be directly connected together, and the resulting line may be directly connected to the solenoid valve 86A and the stroke simulator 90 as in the embodiment shown in FIG. 2. Also, in the embodiment shown in FIG. 1, the solenoid valve 86 and the stroke simulator 90 may be avoided, and the lines 30 and 32 may be directly connected together as in the embodiment shown in FIG. 2. Still alternatively, the lines 14 and 16 may be directly connected together, and the resulting line may be connected to the solenoid valve 86A and the stroke simulator 90 as in the embodiment shown in FIG. 2.

What is claimed is:

1. A motor vehicle brake system, comprising:
   a tandem master cylinder having a first pressure chamber and a second pressure chamber for developing brake fluid pressure in said first and second pressure chambers in response to actuation of a brake pedal;
   wheel cylinders mounted to front and rear wheels for developing braking forces at said front and rear wheels;
   electrically controlled pressure adjusting valves for adjusting brake fluid pressure in corresponding said wheel cylinders;

an electrical controller for controlling said pressure adjusting valves;

a first changeover valve having a first input for being connected to an output of one of said electrically controlled pressure adjusting valves for a first one of said wheel cylinders mounted to one of the front wheels, a second input for being connected to said first pressure chamber in the event of a fault and an output connected to the first one of said wheel cylinders mounted to one of the front wheels;

a second changeover valve having a first input for being connected to an output of one of said electrically controlled pressure adjusting valves for a second one of said wheel cylinders mounted to the other of the front wheels, a second input for being connected to said second pressure chamber in the event of a fault and an output connected to the second one of said wheel cylinders mounted to the other of the front wheels;

wherein said first and second changeover valves are controlled by said controller such that during a normal operation said pressure adjusting valves are connected to respective said wheel cylinders mounted to the front wheels by respective said changeover valves and such that during a brake system failure said first and second pressure chambers of said master cylinder are connected to respective said wheel cylinders mounted to the front wheels by respective said changeover valves.

2. The motor vehicle brake system of claim 1, wherein:

an actuator is connected to said electrically controlled pressure adjusting valves; and wherein said first and second changeover valves are driven by electric power, adapted to permit fluid communication between said master cylinder and said wheel cylinders mounted to the front wheels and to prevent fluid communication between said actuator and said wheel cylinders mounted to the front wheels when no electric power is supplied to said first and second changeover valves, and adapted to prevent fluid communication between said master cylinder and said wheel cylinders mounted to the front wheels and to permit fluid communication between said actuator and said wheel cylinders when electric power is supplied to said first and second changeover valves.

3. The motor vehicle brake system of claim 2, and further comprising at least one stroke simulator that is fluidly connectable with a respective one of said first and second pressure chambers of said tandem master cylinder.

4. The motor vehicle brake system of claim 3, and further comprising a switching means for normally permitting fluid communication between one of said first and second pressure chambers of said tandem master cylinder and a said stroke simulator and, in the event of a system failure, preventing fluid communication between the one of said first and second pressure chambers and the said stroke simulator and permitting fluid communication between the one of said first and second pressure chambers and one of said first changeover valve and said second changeover valve.

* * * * *